US005225652A

United States Patent [19]

Landes

[11] Patent Number: 5,225,652

[45] Date of Patent: Jul. 6, 1993

[54] PLASMA SPRAY APPARATUS FOR SPRAYING POWDERY OR GASEOUS MATERIAL

[75] Inventor: Klaus Landes, Munich, Fed. Rep. of Germany

[73] Assignee: Plasma-Technik AG, Wohlen, Switzerland

[21] Appl. No.: 836,046

[22] Filed: Feb. 12, 1992

[30] Foreign Application Priority Data

Feb. 21, 1991 [DE] Fed. Rep. of Germany ....... 4105408

[51] Int. Cl.[5] .......... B23K 9/00

[52] U.S. Cl. .......... 219/121.470; 219/121.5; 219/121.52; 219/121.48; 219/76.16

[58] Field of Search .......... 219/121.47, 76.16, 76.15, 219/121.50, 121.48, 75

[56] References Cited

U.S. PATENT DOCUMENTS

| | | | |
|---|---|---|---|
| 3,839,618 | 10/1974 | Muehlberger | 219/121.470 |
| 3,866,089 | 2/1975 | Hengartner | 219/121.500 |
| 4,639,570 | 11/1987 | Zverina et al. | 219/121.5 |
| 4,882,465 | 11/1983 | Smith et al. | 219/121.48 |
| 4,990,739 | 2/1991 | Zaplatynsky | 219/121.47 |

*Primary Examiner*—Mark H. Paschall
*Attorney, Agent, or Firm*—Dykema Gossett

[57] ABSTRACT

A plasma spray apparatus for spraying powdery or gaseous material comprises an indirect plasmatron to create an elongated plasma torch. The plasmatron comprises at least one, preferably three cathode members, an annular anode member located distantly from the cathode members and a plasma channel extending from the cathode members to the anode member. The plasma channel is delimited by a plurality of annular neutrode members which are electrically insulated from each other. For axially feeding the powdery or gaseous material into the plasma torch a supply tube is provided which is located close to the cathode member at the beginning of the plasma channel. The plasma channel has a first zone with a reduced diameter located in that region of the plasma torch which is near to the cathode member and a second zone with increased diameter located between the first zone with a reduced diameter and the anode member.

12 Claims, 3 Drawing Sheets

PLASMA SPRAY APPARATUS FOR SPRAYING POWDERY OR GASEOUS MATERIAL

BACKGROUND OF THE INVENTION

1. Field of the Invention

For spraying e.g. powdery material in a molten state onto a substrate surface, plasma spray apparatusses are well known in the art which make use of an indirect plasmatron, i.e. an apparatus for creating a plasma with a plasma torch escaping from a nozzle-like element which plasma torch is electrically not current conductive. Usually, the plasma is created by means of a torch and guided through a plasma channel to an outlet nozzle. Thereby, an important difference exists between an apparatus with a short plasma torch and an apparatus with an elongated plasma torch.

2. Prior Art

In a major portion of all plasma spray apparatusses which are commercially used in these days, the plasma torch is created by means of a high current arc discharge between a pin-shaped cathode member and a hollow cylinder anode member. Thereby, the coating material which has to be molten and axially accelerated, e.g. powdery material like metallic or ceramic powder, is introduced into the plasma torch from the side in the region of the anode member which simultaneously forms the outlet opening of the outlet nozzle. Such proceeding of powder feeding, however, is not advantageous as the powder particles are subjected to a different treatment in the plasma torch, depending on their size and on the velocity with which they are introduced into the plasma torch. For instance, big powder particles pass the plasma torch and are not molten. The result is that the coating material is not fully used for coating a substrate surface and that the quality of the surface to be coated is of inferior quality. Furthermore, the complex relations between the operating parameters render it much more complicate to optimize the plasma spray process. Mainly the disturbance of the plasma torch by the radially fed carrier gas which is necessary for feeding the coating powder into the plasma torch is very disadvantageous.

The European Patent Application Nr. 0 249 238 discloses a plasma generating system in which the supply of the material to be sprayed onto the surface of a substrate is accomplished in axial direction. Particularly, there is provided a tube which enters the apparatus in radial direction through the side wall of a nozzle which is positioned in front of the anode, continues to the center of this nozzle and is bent into a direction corresponding to the axis of the nozzle. However, the arrangement of a supply tube in the center of the plasma torch leads to difficulties because the supply tube and the plasma torch influence each other in a disadvantageous manner. This means, on the one hand, that the flow of the plasma torch is hindered by the provision of the supply tube, and, on the other hand, the supply tube situated in the center of the plasma torch is exposed to an extremely high thermal load.

As far as the energy balance is concerned, the plasma spray devices known in the prior art have a very bad efficiency. One important reason is that only that part of the energy is used for melting the coating material which is present at the end of the plasma torch where it merges into the free plasma flow if the coating material is fed into the plasma torch in the region of the anode member. In fact, a major part of the supplied energy is lost within the plasma channel because the walls of the plasma channel are heated by the plasma torch; thus, this energy is lost for melting the coating material.

These facts are especially true for plasmatrons with an elongated plasma torch. According to the already mentioned EP 0 249 238, such a plasmatron comprises an elongate plasma channel extending from a cathode to an anode. The plasma channel is defined by the interior of a plurality of annular neutrodes which are electrically insulated from each other. An elongated plasma torch, in fact, can develop a higher thermal energy than a short plasma torch, is subjected, on the other hand to more pronounced cooling along its way through the long, relatively narrow plasma channel.

Under these circumstances, the result is that all efforts to obtain an energy concentration in the free plasma which is as high as possible, i.e. in that region of the plasma where the coating material is fed, cannot lead to a substantive improvement of the efficiency due to the reasons discussed hereinabove.

However, some suggestions have been made in the prior art to design plasma spray apparatusses such that their specifications are improved. Particularly, it has been suggested to feed the coating material in the cathode side end of the plasma channel.

The German Utility Model Nr. 1,932,150 discloses a plasma spray apparatus of this kind for spraying powdery material, comprising an indirect plasmatron operating with a short plasma torch. A hollow cathode member cooperates with an anode member which also is of hollow design in the kind of an outlet nozzle. The cathode member and the anode member are coaxially arranged and the cathode member extends into the interior of the annular anode member. The hollow cathode member simultaneously serves as a supply tube for the coating material which, in this manner, is introduced into the space where the plasma torch is created. The plasma gas is fed into the space where the plasma torch is created through an annular gap between the cathode member and the anode member and, therefrom, into the anode member nozzle whereby the plasma torch is narrowed. A major disadvantage of this design is that very high currents have to been used to create the plasma torch and, consequently, the useful operating life of the apparatus is quite low.

Furthermore, it must be mentioned that the mean sojourn time of the coating material escaping from the hollow cathode member in the space where the plasma torch is created is relatively short with the result that the particles of the coating material during its presence in this space can absorb only a small amount of thermal energy, especially because the plasma torch is created initially at the edge of the hollow cathode member and not in the axis in which the coating material is fed. It may be an advantage, under these circumstances, that the powder particles are not completely molten before they escape out of the anode nozzle and, therefor, cannot deposit at the wall of the anode nozzle. However, to completely melt the powder particles and to accelerate them, the paramount portion of energy must be delivered by the free plasma flow which has left the anode nozzle.

OBJECTS OF THE INVENTION

It is an object of the present invention to provide a plasma spray apparatus for spraying powdery or gaseous material which has an improved efficiency.

Particularly it is an object of the present invention to provide a plasma spray apparatus for spraying powdery or gaseous material which can be operated at lower current levels such that the operating life of the parts of the apparatus which are subject to wear is increased.

It is a still further object of the present invention to provide a plasma spray apparatus for spraying powdery or gaseous material in which the material to be sprayed is better and more uniformly processed to improve the quality of the coating of a substrate.

SUMMARY OF THE INVENTION

In order to achieve these and other subjects, the invention provides a plasma spray apparatus for spraying powdery or gaseous material The apparatus of the invention comprises an indirect plasmatron adapted to create an elongated plasma torch and means for axially feeding the powdery or gaseous material into the plasma torch. The plasmatron comprises at least one cathode member, an annular anode member located distantly from the cathode member and a plasma channel extending from the cathode member to the anode member. The plasma channel has a first end close to the cathode member as well as a second end close to the anode member.

The plasma channel is delimited and defined, respectively, by the annular anode member as well as by a plurality of annular neutrode members which are electrically insulated from each other.

The means for axially feeding the powdery or gaseous material into the plasma torch are located close to the first end of the plasma channel The plasma channel has a first zone with a reduced diameter located in that region of the plasma torch which is near to the cathode member and a second zone with increased diameter located between the first zone with a reduced diameter and the anode member.

The above mentioned first zone with a reduced diameter has the effect to compress the plasma created at the beginning of the plasma channel and, simultaneously, narrows the electric current distribution. The result is that, as far as the gas flow parameters are concerned, the pressure and the temperature of the gas is increased and that, as far as the electric parameters are concerned, an improved heating may be achieved in the center of the plasma channel. Furthermore, it appears that the current lines which are compressed in the first zone with a reduced diameter remain concentrated in the further path through the plasma channel, due to the effect of attraction between parallely running current lines; with other words, there is a sort of plasmadynamic pinch effect over the entire extension of the plasma channel initiated by the zone with a reduced diameter.

Practical tests with a plasma spray apparatus comprising a zone with a reduced diameter have shown that an increased energy concentration and an increased velocity of the plasma can be observed in a zone close to the longitudinal axis and in a region close to the cathode assembly of the plasma channel, where the spray material is fed into the plasma channel. Thereby, the heat transfer from the plasma torch to the spray material, e.g. to the powder particles, in order to melt these particles and to accelerate them is considerably improved Without the above mentioned zone with a reduced diameter, a "cold center" in the plasma torch is recognizable The mentioned zone with a reduced diameter according to the invention, however, does not have any anodic function.

Some of the apparatusses of the prior art may have a zone with a reduced diameter This zone, however, is located always beyond the region of the plasma torch and influences but the free plasma stream and not the plasma torch.

A very important advantage of the invention, i.e. of the plasma spray apparatus operating with an elongated plasma torch in which the spray material is fed to the plasma channel close to the cathode assembly, may be also seen in the fact that energy is fed to the spray material along the entire length of the high-energy plasma torch with the result that the spray material escapes the plasma channel in an already molten state. In the devices of the prior art, only a part of the energy of the plasma torch is used, i.e. that part which results when the plasma torch is transferred to the free plasma. An important remaining part of the energy of the plasma torch is lost by heat transfer from the plasma torch to the walls of the relatively narrow plasma channel.

Since the invention provides that the plasma channel has an increased or increasing diameter from the zone with reduced diameter towards the anode, the heat losses from the concentrated plasma torch may be considerably reduced and the effort in cooling the apparatus is correspondingly less.

According to a preferred embodiment, the diameter of the plasma channel at the anodic end is at least 1.5 times the diameter of the narrowest part of the zone with a reduced diameter. Thereby, the further zone of the plasma channel extending from the first zone with a reduced diameter to the anode may have an essentially cylindrical shape or, according to a still further embodiment, may have an essentially conical shape with increasing diameter from the first zone with a reduced diameter to the anode member.

The inner diameter of the anode member can have a greater diameter than the plasma channel, and/or the anode member may conically open towards its outlet. By these measure, individually or in combination, not only a depositing of the spray material at the anode member can be avoided, but the thermal load on the anode member may be reduced.

The neutrodes which form the plasma channel are usually separated from each other by annular insulating discs which are offset with regard to the wall of the plasma channel by a certain amount in order to avoid an excess thermal load of these insulating discs. Therefore, the wall of the plasma channel is not continuous, but interrupted by gaps between the neutrodes. The result is that undesired turbulences can occur in the region of the wall of the plasma channel, particularly in its cathode-sided end where the above mentioned zone with a reduced diameter is located Thus, in a preferred embodiment, the one of the annular neutrode members which is closest to the cathode member extends at least up to the narrowest part of the zone having a reduced diameter Preferably, the spray material is fed into the plasma channel through a supply tube by means of a carrier gas. From the end of this supply tube, the paths of the individual particles of the spray material extend essentially within a cone. Due to the provision of the zone of the plasma channel having an increased diameter, it may be achieved that this cone entirely spreads out within the plasma channel and does not hit the walls of the plasma channel in order to avoid that the molten particles of the spray material can deposit on the plasma channel wall. If the particles of the spray material should hit the above mentioned zone with a reduced diameter, no severe consequences would result because in this position the particles are not yet molten.

For axially feeding the powdery or gaseous material into the plasma torch, a central tube member having a free end may be provided which is axially aligned with regard to the plasma channel. Preferably, the free end of the tube member extends into the interior of the one of the neutrode members which is closest to the cathode.

The cathode may comprise a plurality of rod-shaped cathode pins which are distributed along the periphery of a circle around the central tube member whereby the cathode pins run parallel to each other and are symmetrically located around the central tube member. On the other hand, the cathode can comprise a hollow cathode body which simultaneously constitutes the tube member for the feeding of the powdery or gaseous material.

BRIEF DESCRIPTION OF THE DRAWINGS

In the following, preferred embodiments of the apparatus according to the invention will be further described, with reference to the accompanying drawings, in which.

DETAILED DESCRIPTION OF THE PREFERRED EMBODIMENTS

Figure 1:
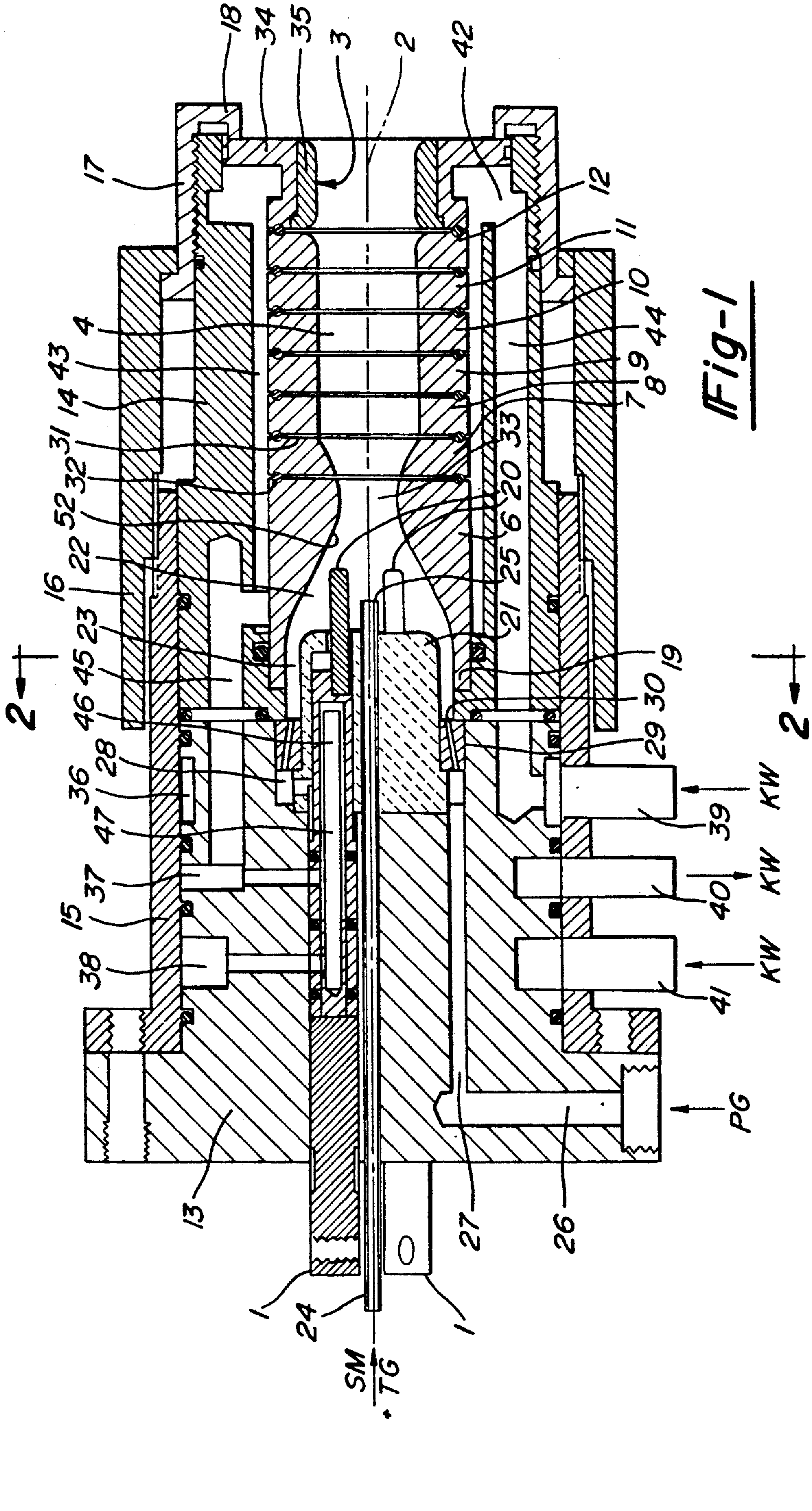
FIG. 1 shows a longitudinal sectional view of a first embodiment of the plasma spray apparatus having three cathode members.
Figure 2:
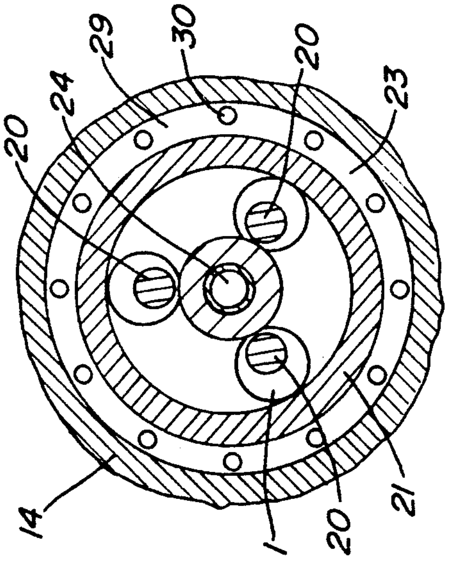
FIG. 2 shows a partial cross sectional view of the cathode member region of the embodiment of FIG. 1 according to the line II—II in FIG. 1, in an enlarged scale.

The plasma spray apparatus shown in FIGS. 1 and 2 comprises three cathode members in the form of longitudinal rod-like cathode assemblies 1 which run parallel to each other and which are arranged on the periphery of a circle around the central longitudinal axis 2 of the apparatus. The arrangement of the cathode assemblies 1 is symmetric with reference to the central longitudinal axis and the cathode assemblies 1 are evenly distributed along the periphery of the circle. Further, the apparatus comprises an annular anode 3 which is located in a certain distance away from the cathode assemblies 1 as well as a plasma channel 4 extending essentially between the ends of the cathode assemblies 1 and the anode 3. The plasma channel 4 is delimited by a plurality of essentially annularly shaped neutrodes 6 to 12 which are electrically insulated with regard to each other as well as by the annular anode 3.

The cathode assemblies 1 are fixed in a cathode support member 13 consisting of an electrically insulating material. Coaxially thereto arranged, adjacent to one end of the cathode support member 13, is a hollow sleeve-like anode support member 14 made of an electrically insulating material which surrounds the neutrodes 6 to 12 as well as the anode 3. The above described arrangement is fixed together by means of three metal sleeves 15, 16 and 17. The first metal sleeve 15 has a flange on its one side (left in FIG. 1) which is fixed by means of screws (not shown) to an end flange of the cathode support member 13. The other end of the first metal sleeve 15 has an outer screw thread and is screwedly fixed to the one end of the coaxially arranged second metal sleeve 16 which comprises a corresponding inner screw thread. The other end of the second metal sleeve 16 is provided with a flange directed to its interior. The third metal sleeve 17 comprises at its one end (right in FIG. 1) an inner screw thread and is screwed on an outer screw threaded provided on the outer surface of the anode support member 14. The other end of the third metal sleeve 17 comprises an outer flange engaging the above mentioned inner flange provided at the (in FIG. 1) right end of the second metal sleeve 16. Thus, after the first metal sleeve 15 has been fixed to the flange of the cathode support member 13 and after the third metal sleeve 17 has been screwed on the anode support member 14, the second metal sleeve 16 can be slid over the third metal sleeve 17 to be screwed onto the first metal sleeve 15, thereby pressing the anode support member 14 against the cathode support member 13.

The third metal sleeve 17 further comprises a flange edge 18 resting against the part 34 of the anode 3. Thereby, the elements forming the plasma channel 4 are held together whereby the neutrode 6 out of the plurality of neutrodes 6 to 12 which is closest to the cathode assemblies 1 rests against an inner recess 19 provided on the anode support member 13.

The cathode assemblies 1 are provided, on its free ends directed towards the plasma channel 4, with cathode pins 20 which consist of a material having an especially good electric and thermal conductivity and, simultaneously, having a high melting temperature, e.g. thoriated tungsten. Thereby, the cathode pins 20 are arranged with reference to the cathode assemblies such that the axis of a cathode pin 20 is not coaxial with the axis of the related cathode assembly 1. This offset is such that the axes of the cathode pins 20 are closer to the central longitudinal axis 2 of the apparatus than the axes of the cathode assemblies 1.

The side of the cathode support 13 facing the plasma channel 4 is provided with a central insulating member 21 made of a material with a very high melting temperature, e.g. glass ceramics material. The insulating member 21 has frontal apertures through which the cathode pins 20 extend into a hollow chamber 22 which is defined by the interior of the first neutrode 6 located closest to the cathode assemblies 1 and forming the beginning of the plasma channel 4. The freely exposed part of the outer jacket surface of the insulating member 2 radially faces with a certain distance a part of the wall of the plasma channel 4 defined by the interior of the neutrode 6; thereby, an annular chamber 23 is formed which serves for feeding the plasma gas into the hollow chamber 22 at the beginning of the plasma channel 4.

The supply of the material SM to be sprayed onto a substrate, e.g. metallic or ceramic powder, into the plasma torch is accomplished with the help of a carrier gas TG at that end of the plasma channel 4 which is close to the cathode assemblies 1. For this purpose, there is provided a supply tube 24 extending along the longitudinal axis 2 of the apparatus and fixed in the center of the insulating member 21. The supply tube 24 ends in the hollow chamber 22 whereby the cathode pins 20 extend farther into the plasma channel 4 than the outlet 25 of the supply tube 24.

The plasma gas PG is fed through a transverse channel 26 provided in the cathode support member 13. The transverse channel 26 merges into a longitudinal channel 27 also provided in the cathode support member 13. Further, the cathode support member 13 is provided with an annular channel 28, and the outlet of the longitudinal channel 27 merges into the annular channel 28. The plasma gas PG, entering the transverse channel 26, flows, through the longitudinal channel 27 into the annular channel 28 and, therefrom, into the annular chamber 23. In order to achieve an optimized laminar flow of the plasma gas PG into the hollow chamber 22, the insulating member 21 is provided with an annular distribution disc 29 having a plurality of apertures 30 which interconnect the annular channel 28 with the annular chamber 23.

The elements defining the plasma channel 4, i.e. the neutrodes 6 to 12 and the anode 3, are electrically insulated from each other by means of annular discs 31 made of an electrically insulating material, e.g. boron nitride, and gas tightly interconnected to each other by means of sealing rings 32. The plasma channel 4 comprises a zone 33 which is located near to the cathode assemblies 1 and which has a smaller diameter than other zones of the plasma channel 4. Starting from that zone 33 with reduced diameter, the plasma channel increases its diameter towards the anode 3 up to a diameter which is at least 1.5 times the diameter of the plasma channel 4 at its narrowest point, i.e. in the center of the zone 33. According to FIG. 1, after this diameter increase, the plasma channel 4 has cylindrical shape up to its end close to the anode 3.

The neutrodes 6 to 12 preferably are made of copper or a copper alloy. The anode 3 is composed of an outer ring 34, made e.g. of copper or a copper alloy, and an inner ring 35, made of a material having a very good electrical and thermal conductivity and simultaneously having a very high melting temperature, e.g. thoriated tungsten.

In order to avoid that the plasma ga flow is disturbed by eventually present gaps in the wall of the plasma channel 4 in the region of the beginning of the plasma channel 4, i.e. close to the cathode assemblies 1, the neutrode 6 located closest to the cathode assemblies 1 extends over the entire zone 33 with reduced diameter. The result is that the wall 52 of the plasma channel 4 in the region of the cathode-sided end thereof is continuously shaped and smooth over the entire zone 33 with reduced diameter.

All parts which are immediately exposed to the heat of the plasma torch and of hot plasma gases are cooled by means of water. For this purpose, several water circulation channels are provided in the cathode support member 13, in the cathode assemblies 1 and in the anode support member 14 in which cooling water KW can circulate. Particularly, the cathode support member 13 comprises three annular circulation channels 36, 37 and 38, which are connected to supply pipes 39, 40 and 41, respectively. The anode support member 14 comprises an annular circulation channel 42 located in the region of the anode 4 and an annular cooling chamber 43 located in the region of the neutrodes 6 to 12 which surrounds all the neutrodes 6 to 12. Cooling water KW is fed via the supply pipes 39 and 41. The cooling water fed by the supply pipe 39 passes a longitudinal channel 44 and is primarily directed to the annular circulation channel 42 surrounding the thermically most loaden anode 3. Therefrom, the cooling water flows through the cooling chamber 43 along the jacket surface of the neutrodes 6 to 12 back and through a longitudinal channel 45 into the annular circulation channel 37. The cooling water fed by the supply pipe 41 enters the annular circulation channel 38 and, therefrom, in a cooling chamber 46 associated to each cathode assembly 1; the cooling chamber 46 is subdivided by a cylindrical wall 47. From the cathode assemblies, the cooling water finally flows into the annular circulation channel 37 as well, and the entire cooling water escapes the apparatus via supply pipe 40.

Figure 3:
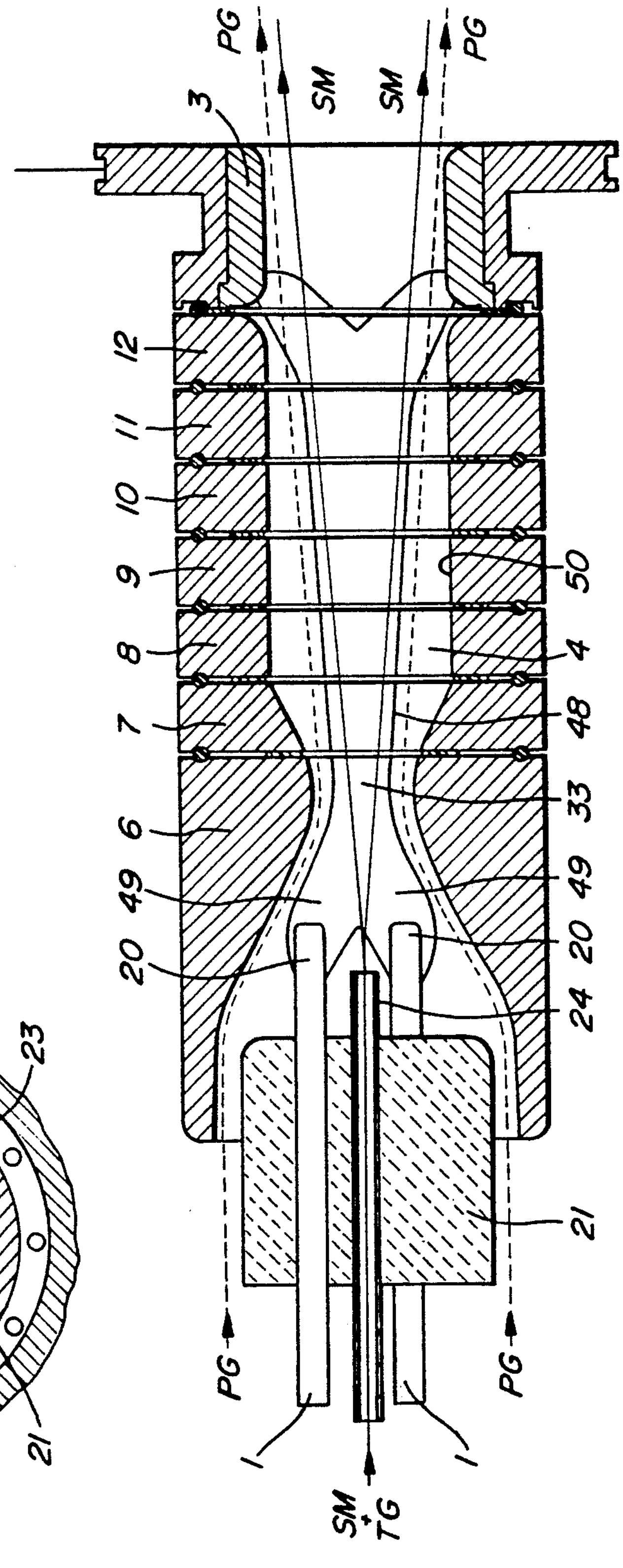
FIG. 3 a schematic sectional view of the plasma channel of the embodiment of FIG. 1 in an enlarged scale, whereby the flow the plasma gas and the powdery or gaseous material is indicated.
Figure 6:
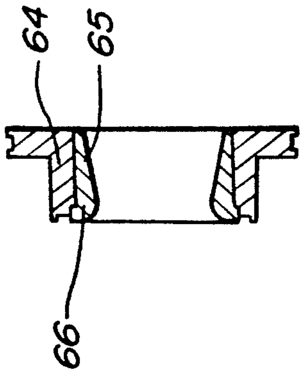
FIG. 6 shows a detail of the anode member in a sectional view.

In FIG. 3, there are schematically shown the approximate shape of the plasma torch 48 when the apparatus according to FIGS. 1 and 2 is in operation as well as the approximate flow path of the plasma gas PG and the path of the spray material SM. The effect of the zone 33 with reduced diameter within the plasma channel 4 and the subsequent expansion thereof can be clearly seen in FIG. 3. The individual plasma torch branches 49 starting at the several cathode pins 20 are united very close to their points of origin; this effect is based on the facts that the cathode pins 20 are located very close to each other and, on the other hand, a zone 33 with a reduced diameter is present and is located near to the cathode assemblies 1. Thereby, the plasma torch and the flow lines are narrowed to such a degree that a very high energy concentration is present in the center of the plasma channel 4 even at the point where the spray material is fed into the plasma channel 4; consequently, the occurrence of a "cold" center region usually present in an apparatus according to the prior art is avoided In the expanded region of the plasma channel 4, following the zone 33 with reduced diameter, seen towards the anode 3, the distance between the plasma torch and the wall 50 of the plasma channel 4 is quite large. The result is that the wall 50 is exposed to less thermal load in this region and, consequently, the energy which must be removed by cooling water is reduced.

Figure 4:
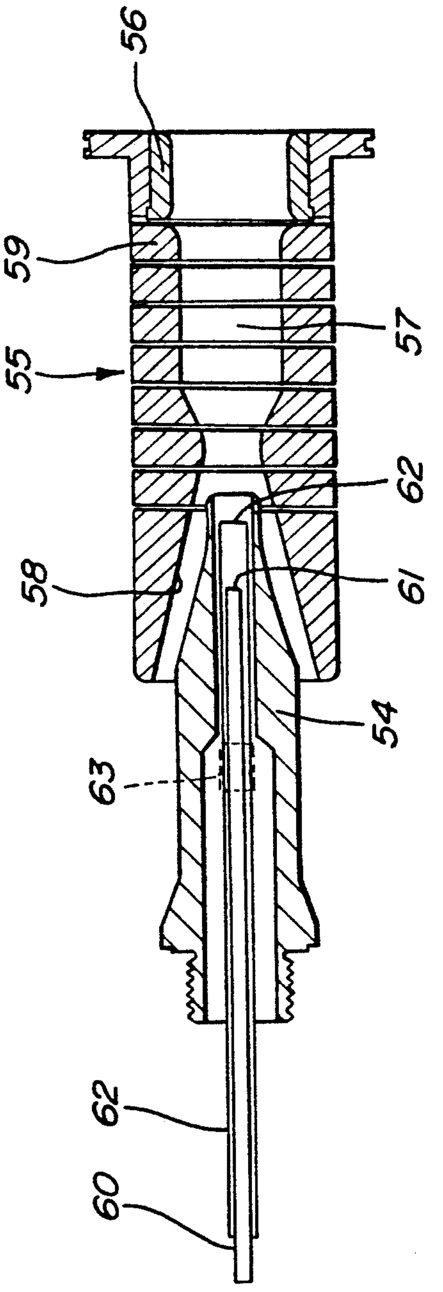
FIG. 4 shows a schematic partial sectional view of the relevant parts of a second embodiment of the apparatus of the invention.
Figure 5:
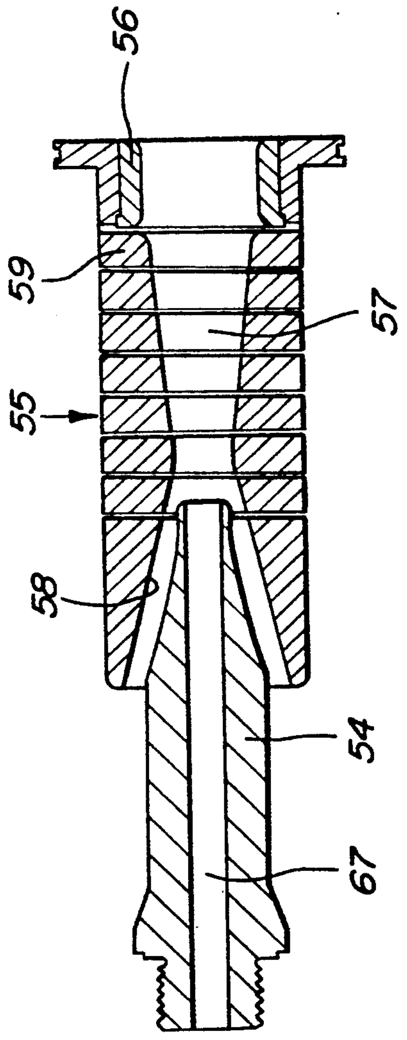
FIG. 5 shows a schematic partial sectional view of the relevant parts of a third embodiment of the apparatus of the invention.

In FIGS. 4 and 5, there are schematically shown further embodiments of the apparatus of the invention whereby only the most relevant parts of the apparatus are shown. In both these embodiments, there is provided but a single cathode 54 in the form of a hollow cathode member. The plurality of neutrodes, generally designated by reference numeral 55, and the annular anode 56 which together define the plasma channel 57 are of essentially the same design as the corresponding elements shown in FIG. 1 and described hereinabove. One difference is that, in these embodiments, the input region 58 of the plasma channel 57 is less inclined with reference to the central axis of the apparatus, and a further difference is that the annular anode ring 56 has a greater inner diameter than the the neutrode 59 which is located next to the anode ring 56.

According to the embodiment shown in FIG. 4, the hollow cathode member 54 comprises a coaxial tube 60 for the feeding of the powdery or gaseous spray material The end portion 61 of the tube 60 is somewhat recessed with regard to the end of the hollow cathode member 54 Further, the hollow cathode member 54 is provided with an insulating tube 62, the end portion thereof being longer than the end portion 61 of the tube 60. The insulating tube 62 fixes the position of the supply tube 60 by means of an annular distance member 63 in radial direction; simultaneously, the insulating tube 62 provides for an isolation of the tube 60 from the cathode member 54 and protects the tube 60 from extreme heat.

The embodiment according to FIG. 5 is very similar to the embodiment according to FIG. 4, with the difference, that the supply tube 60, the insulating tube 62 and the distance member 63 are omitted. The spray material is directly fed through a central aperture 67 of the hollow cathode member 54.

As far as the further design and construction details are concerned, the embodiments according to FIGS. 4 and 5 can be identical or similar to the embodiment according to FIG. 1.

Finally, FIG. 5 shows a different embodiment of an anode member 64 which is usable with either the embodiment according to FIG. 4 or to the one according to FIG. 5. The anode member 64 comprises an anode ring 66 having a inner surface 65 which conically opens towards the outlet of the apparatus, i.e. which has a continuously increasing diameter from the neutrode side to the outlet.

What is claimed is:

1. A plasma spray apparatus for spraying powdery or gaseous material, comprising:

a plasmatron adapted to create an elongated plasma torch;

means for axially feeding said powdery or gaseous material into said plasma torch;

said plasmatron comprising at least one cathode member, an annular anode member located distantly from said cathode member and a plasma channel extending from said cathode member to said anode member and having a first end close to said cathode member as well as a second end close to said anode member;

said plasma channel being delimited by said annular anode member as well as by a plurality of annular neutrode members which are electrically insulated from each other;

said means for axially feeding said powdery or gaseous material into said plasma torch being located close to said first end of said plasma channel; and said plasma channel having a first zone with a reduced diameter located in that region of said plasma torch which is near to said cathode member and a second zone with increased diameter located between said first zone with a reduced diameter and said anode member.

2. A plasma spray apparatus according to claim 1 in which said second zone of said plasma channel extending from said first zone to said anode member has an essentially cylindrical shape.

3. A plasma spray apparatus according to claim 1 in which said second zone of said plasma channel extending from said first zone to said anode member has an essentially conical shape with increasing diameter from said first zone to said anode member.

4. A plasma spray apparatus according to claim 1 in which said annular anode member has a greater diameter than the one of said annular neutrode members which is closest to said anode member.

5. A plasma spray apparatus according to claim 1 in which said annular anode member has a conical inner surface which has a diameter increasing from the one of said annular neutrode members which is closest to said anode member to the free end of said anode member.

6. A plasma spray apparatus according to claim 1 in which the diameter of said plasma channel at said second end is at least 1.5 times the diameter of the narrowest part of said first zone with a reduced diameter.

7. A plasma spray apparatus according to claim 1 in which the one of said annular neutrode members which is closest to said cathode member extends at least up to the narrowest part of said first zone having a reduced diameter 8. A plasma spray apparatus according to claim 1 in which said means for axially feeding said powdery or gaseous material into said plasma torch comprise a central tube member having a free end and which is axially aligned with regard to said plasma channel, said free end of said tube member extending into the interior of the one of said neutrode members which is closest to said cathode member.

9. A plasma spray apparatus according to claim 1 in which said cathode member comprises a plurality of rod-shaped cathode pins which are distributed along the periphery of a circle around said central tube member.

10. A plasma spray apparatus according to claim 1 in which said cathode pins run parallel to each other and are symmetrically located around said central tube member 11. A plasma spray apparatus according to claim 1 in which said cathode member comprises a hollow cathode body which simultaneously constitutes the tube member for the feeding of the powdery or gaseous material.

12. A plasma spray apparatus according to claim 1 which said cathode member comprises a hollow cathode body which surrounds an isolated tube member for the feeding of the powdery or gaseous material.

* * * * *